United States Patent [19]

Tietjen et al.

[11] Patent Number: 5,649,125
[45] Date of Patent: Jul. 15, 1997

[54] METHOD AND APPARATUS FOR ADDRESS EXTENSION ACROSS A MULTIPLEXED COMMUNICATION BUS

[75] Inventors: Donald L. Tietjen; Frank C. Galloway; David M. Menard; Ronny L. Arnold; Nancy G. Woodbridge, all of Austin, Tex.

[73] Assignee: Motorola, Inc., Schaumburg, Ill.

[21] Appl. No.: 550,311

[22] Filed: Oct. 30, 1995

[51] Int. Cl.$^6$ .................................................. G06F 13/40
[52] U.S. Cl. ............................... 395/306; 395/421.01
[58] Field of Search .......................... 395/824, 421.01, 395/421.02, 402, 280, 306, 307, 800, 775, 281

[56] References Cited

U.S. PATENT DOCUMENTS

| | | | |
|---|---|---|---|
| 4,307,448 | 12/1981 | Sathers | 395/402 |
| 4,361,868 | 11/1982 | Kaplinsky | 395/402 |
| 4,633,437 | 12/1986 | Mothersole et al. | 364/900 |
| 4,751,632 | 6/1988 | Mothersole et al. | 364/200 |
| 4,796,177 | 1/1989 | Nishimura et al. | 395/402 |
| 4,799,187 | 1/1989 | Einarson et al. | 395/421.1 |
| 4,799,199 | 1/1989 | Scales et al. | 365/238 |
| 5,113,369 | 5/1992 | Kinoshita | 395/307 |
| 5,148,539 | 9/1992 | Enomoto et al. | 395/307 |
| 5,386,579 | 1/1995 | Bourrekas et al. | 395/800 |
| 5,420,992 | 5/1995 | Killian et al. | 395/375 |
| 5,426,751 | 6/1995 | Sawamoto et al. | 395/402 |

OTHER PUBLICATIONS

Frank C. Galloway, Motorola Microprocessors User's Manual (M6806UM/AD Rev. 1), pp. 2–4 and pp. 7–32 (1994).

*Primary Examiner*—Gopal C. Ray

[57] ABSTRACT

A data processing system (10) having a bus controller (5) and a multiplexed communication bus (22) and provides a portion of the valid address information during the data phase. In one embodiment, in response to an address extension control signal, the bus controller (5) allocates the communication bus (22) to provide the address extension on conductors not needed for data, reducing the need for address latch circuitry. In an alternate embodiment, the bus controller (5) provides burst transfers where the processor core (2) increments a portion of each address with each data in the burst. For such burst transfers, the length of the desired data is controlled by a sizing signal (42) from the core (2) or from cache and the increment size is supplied by the system resource (7).

21 Claims, 7 Drawing Sheets

A/D —ADDRESS AND DATA
DA* —DATA ACKNOWLEDGE
ESIZ —(EXTERNAL) REQUEST DATA LENGTH VALUE
ISIZ —(INTERNAL) REQUESTED DATA LENGTH VALUE
TBI* —TRANSFER BURST INHIBIT
TS* —TRANSFER START
OTH —OTHER CONTROLS

| DYNAMIC BURST CLOCKS |||||
| --- | --- | --- | --- | --- | --- |
| OPERAND SIZE | PORT SIZE | BURST CLOCKS || NON-BURST CLOCKS ||
| | | READ | WRITE | READ | WRITE |
| BYTE | BYTE | 2 | 2 | 2 | 2 |
| BYTE | WORD | 2 | 2 | 2 | 2 |
| BYTE | LONGWORD | 2 | 2 | 2 | 2 |
| WORD | BYTE | 3 | 3 | 5 | 4 |
| WORD | WORD | 2 | 2 | 2 | 2 |
| WORD | LONGWORD | 2 | 2 | 2 | 2 |
| LONGWORD | BYTE | 5 | 5 | 11 | 8 |
| LONGWORD | WORD | 3 | 3 | 5 | 4 |
| LONGWORD | LONGWORD | 2 | 2 | 2 | 2 |
| LINE | BYTE | 17 | 17 | 47 | 32 |
| LINE | WORD | 9 | 9 | 23 | 16 |
| LINE | LONGWORD | 5 | 5 | 11 | 8 |

METHOD AND APPARATUS FOR ADDRESS EXTENSION ACROSS A MULTIPLEXED COMMUNICATION BUS

REFERENCE TO RELATED APPLICATIONS

The present application is related to the following U.S. patent application:

"Method And Apparatus For Bursting Operand Transfers During Dynamic Bus Sizing", invented by Donald L. Tietjen et al., [Attorney Docket No. SC-02884A] having Ser. No. 08/550,043, filed concurrently herewith on Oct. 30, 1995, and assigned to the assignee hereof.

FIELD OF THE INVENTION

The present invention relates in general to a data processing system, and more particularly to a method of driving address on a multiplexed bus.

BACKGROUND OF THE INVENTION

The performance of a microprocessor in data processing applications is affected by its efficiency in communication with system resources. Efficiency includes the cost reduction of a system as a whole, optimization of data transfer time, as well as ability to communicate with a variety of system resources. Although some can, many other memory devices are not capable of accessing subsequent data in a burst. These devices require incremented address inputs pointing to each datum in the burst sequentially. The complexity and cost of interface for these devices is proportional to the size of this interface. System resources include external peripherals and internal modules, neither of which are necessarily of uniform data width ( i.e. port size.) Many times an external device3 s size is a sub-multiple of the bit capability of a microprocessor. This is particularly true when considering 32 bit microprocessors as they may be used to communicate byte (8 bits), word (16 bits), longword (32 bits) or line (128 bits) information to memory that is byte, word, or longword width, all of which are port sizes that are equal to or sub-multiples of the 32 bit microprocessor. To accommodate the potential vagaries of the system, a bus controller, either internally or externally, manages the interface between the central processing unit (CPU) and the various resources of the system. Such a bus controller receives control signals from the CPU as well as the other system resources, and based on these signals determines parameters of data required and configuration of each resource port, and performs requested data transfers. System cost is based on individual costs of each module together with costs of connection devices. These connection devices allow modules to communicate and to function together as a system.

In most system resources which are memories, each unit of data is associated with a unique address. That is, each unique address has associated with it a byte of data. A data transfer involves the processor core supplying an address followed by a read or write of operand data. A memory unit typically requires some device to latch address information received from the system while the device processes the data information associated with that address. In some situations required data length exceeds data port width, for example, the situation in which a processor core requests a word of data while the system's memory device is only capable of byte width sized data transfers. In this case, only the first address or access address is necessary, as successive data is located at subsequent addresses. Some memory devices are capable of supplying subsequent data without being supplied each incremental address. Data is sent in a "burst" starting with the data of the access address and requires no further address information for that particular burst.

Typically, burst data is information to be stored in cache memory for later access. In most cache applications, the length of data to be stored in a cache memory is typically fixed at one line. In most cache applications, the length of total burst and the size of burst increment are each a fixed length, typically line and longword respectively. Burst then is used to efficiently transfer one line of data in four longword size bursts. This proves to be an efficient use of the communication bus or busses and produces a reduction in total cycle count necessary for specific types of data transfers having a fixed burst increment size and a fixed length of data (e.g. one line.) However, these ideas do not fully exploit all concepts of burst transfers and may not reduce system cost as a whole.

There exist many types of system resources, some of which are not capable of accessing the subsequent data in burst transfers (i.e. not burst capable.) These resources typically receive address as an input which is sequentially incremented with each datum in a burst and supplied to the resource externally. The complexity of this external interface to supply address information adversely affects the ease of design, the efficiency, and the cost.

DESCRIPTION OF THE PREFERRED EMBODIMENT

The present invention allows more flexible communication in a data processing system, while significantly reducing system cost as a whole. This is done with a data processing system having a bus controller that uses a communication bus which has a multiplexed address and data bus, and is capable of driving address information over a portion of the bus during the data phase of a data transfer. In one embodiment this communication bus is considered to include an address and data bus. The processing system of one embodiment has a processor core which is made up of a central processing unit (CPU) and memory bank. In alternate embodiments of the present invention, the processor core may include CPU, cache memory module, memory management controller unit, direct memory access unit, and/or multiple CPUs, as well as other modules. The ability to drive a portion of the address information during an entire transfer cycle of the communication bus (i.e. address phase plus data phase) is coupled with burst transfer capability. In one embodiment, control signals provide required parameters of each transfer from which the bus controller transfers operands and/or instructions in incremental bursts between a processor core and various system resources. The bursts represent successive bytes of data associated with sequential addresses where the burst increment equals the size of the data port. In some literature this burst increment is referred to as a beat. In one embodiment, burst capability is dependent on a system resource's ability to burst data and can be inhibited with a transfer burst inhibit signal from a system resource. In one embodiment, control signals include, but are not limited to, requested data length as a sizing signal from a processor core and increment size or data port size from a system resource. In one embodiment, control signals include, but are not limited to, (1) length of the requested data as a sizing signal from the processor core, and (2) increment size or data port size from the system resource.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. For clarity, the case of a signal which has a logic level zero true state will be so signified by an asterisk following the name of the signal (e.g. ITS* is the Internal Transfer Start signal which has an active low level.)

Brackets will be used to indicate the conductors of a bus or the bit locations of a value. For example, "bus 20 [0–7]" or "conductors [0–7] of bus 20" indicates the eight lower order conductors of bus 20, and "address bits [0–7]" or "ADDRESS [0–7]" indicates the eight lower order bits of an address value.

Figure 1:
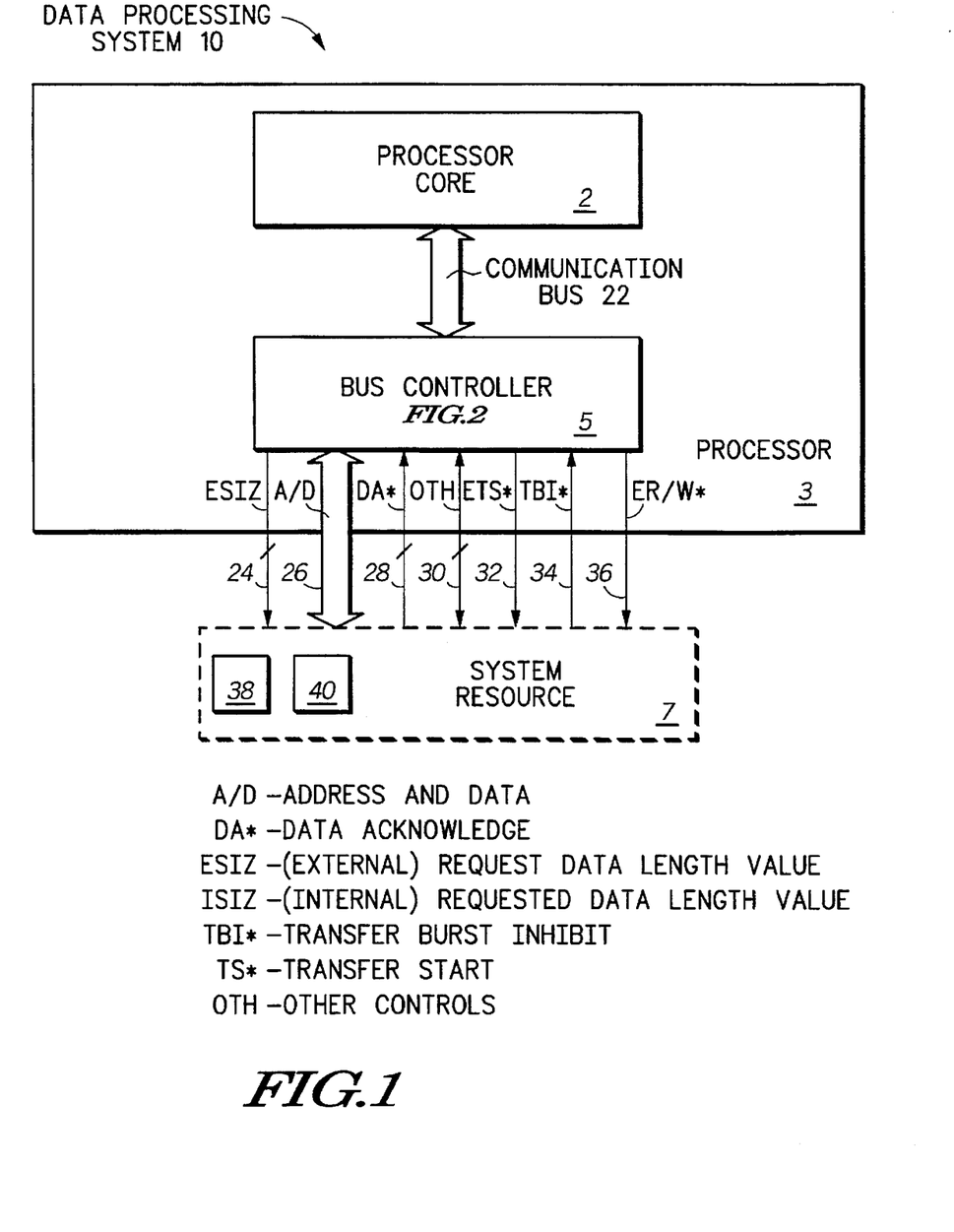
FIG. 1 illustrates, in block diagram form, a data processing system 3 in accordance with one embodiment of the present invention.

FIG. 1 illustrates a data processing system 10 having a data processor 3 and a system resource 7. Data processor 3 is coupled to system resource 7 by way of A/D bus 26 and by way of control signal conductors 24, 28, 30, 32, 34, and 36. Although the embodiments of the present invention illustrated in FIGS. 1–5 illustrate bus 26 as being a 32-bit bus, alternate embodiments of the present invention may use any number of conductors in each bus.

Data processor 3 includes a processor core circuitry 2 which is bi-directionally coupled to bus controller 5 by way of communication bus 22. In alternate embodiments of the present invention, various portions of data processing system 10 may be implemented on the same or on different integrated circuits. In one embodiment of the present invention, all of data processing system 10 may be implemented on one integrated circuit.

Still referring to FIG. 1, in this embodiment, system resource 7 is made up of many individual peripheral units represented by units 38 and 40, each with a data port which is coupled to bus controller 5 by way of A/D bus 26, and control signal conductors ESIZ 24, DA* 28, OTH 30, ETS* 32, TBI* 34, and ER/W* 36. In alternate embodiments the peripheral units within the system resource 7 may be as few as one single peripheral unit or may be a plurality of units. In one embodiment, system resource 7 is formed on a separate integrated circuit. In alternate embodiments, system resource 7 and processor 3 may be built on the same integrated circuit.

Figure 2:
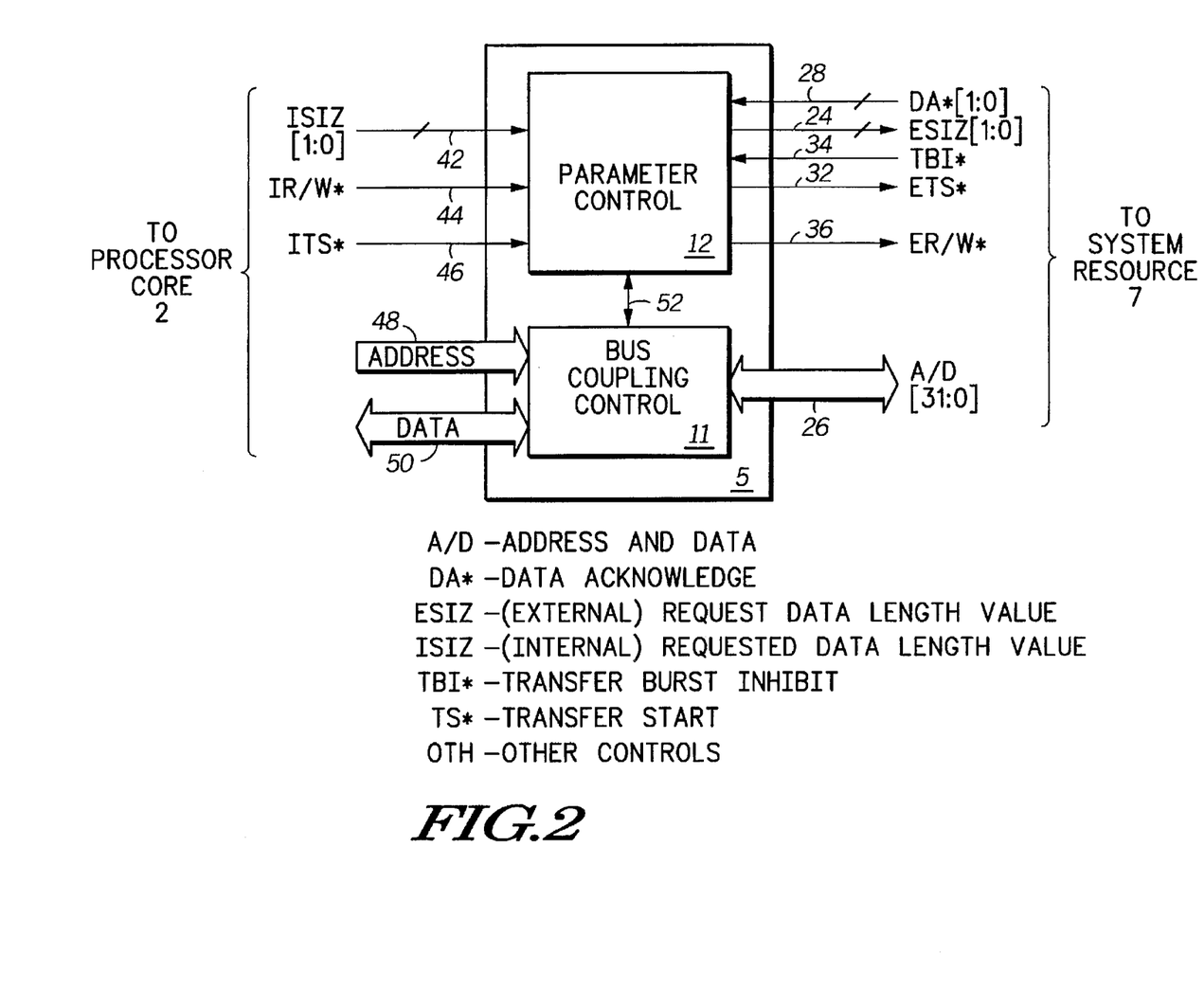
FIG. 2 illustrates, in block diagram form, a bus interface 5 in accordance with one embodiment of the present invention.

Referring now to FIG. 2, FIG. 2 details bus controller 5 as consisting of parameter control circuit 12 which is bi-directionally coupled to bus coupling control circuit 11 via bus 52. The parameter control circuit 12 is coupled to core 2 by way of conductors IR/W* 44, ITS* 46, and ISIZ 42, and is coupled to system resource 7 by way of conductors DA* 28, ESIZ 24, TBI* 34, ETS* 32, and ER/W* 36. The bus coupling control unit 11 is coupled to core 2 by Address bus 48 and Data bus 50, and to system resource 7 by way of bus A/D 26.

Referring to FIG. 1, the present invention uses a bus controller 5 to interface between a processor core 2 and a system resource 7. Bus controller 5 and system resource 7 may be formed on a same integrated circuit, or in alternate embodiments may be formed on separate integrated circuits. In one embodiment of the present invention, bus controller 5 is internal to an integrated circuit processor 3 and system resource 7 is external to an integrated circuit processor 3. The bus controller 5 is capable of transferring data between processor core 2 and system resource 7 based on parameter information supplied to bus controller 5 from processor core 2 regarding requested data length and from system resource 7 regarding port size. Note that in one embodiment processor core 2 provides the requested data length information to bus controller 5 by way of one or more conductors in communication bus 22. In one embodiment port size is a sub-multiple of the bit capability of processor core 2. Bus controller 5 sizes A/D bus 26 to the necessary bit width and is capable of re-sizing A/D bus 26 following any complete data transfer. Note that in one embodiment of the present invention bus size is not changed within a burst transfer. Further, bus controller 5 is able to transfer this data in dynamically sized bursts (i.e. burst increment may change from one transfer to the next) from system resource 7. In one embodiment, bus controller 5 defaults to burst transfers until system resource 7 signals a transfer burst inhibit signal. Alternate embodiments of the present invention could instead use a burst enable signal to maintain burst transfer mode.

To first demonstrate the various methods of data transfer, FIG. 2, illustrates one embodiment of the present invention where bus controller 5 interfaces between processor core 2 and external system resource 7 using time multiplexed address and data busses. Alternate embodiments of the present invention may use any combination of multiplexed and non-multiplexed busses. In this embodiment of the present invention, processor core 2 indicates data transfer start with Internal Transfer Start (ITS*) signal 46 as well as indicating the direction of the next transfer with the Internal Read/Write (IR/W*) signal 44 input to bus controller 5. In this embodiment ITS* 46 is a signal with a logical true state of zero and IR/W* 44 is a signal wherein logical one signifies a data read and logical zero signifies a data write. Note that in one embodiment of the present invention, bus controller 5 is capable of data bursts for read transfers (i.e. data from system resource to processor core) and write transfers (i.e. data from processor core to system resource) transfers. In one embodiment processor core 2 supplies a requested data length value called Internal Size (ISIZ) signal 42 to indicate the length of the requested data. The processor core supplies the requested data length value to bus controller 5 by way of one or more conductors in communication bus 22. Parameter control circuit 12 of bus controller 5 processes this requested data length information and sends the value on External Size conductor ESIZ signal 24 to system resource 7. Note that in this embodiment the value ESIZ 24 is equal to the value of ISIZ 42 and each signal is two bits in length. Alternate embodiments of the present invention may use only one or may use any number of ISIZ signals 42 and ESIZ signals 24 depending upon the number of available port sizes and data lengths. Note also that in other embodiments of the present invention, the requested data length value may alternatively be encoded on other signals instead of separately provided on the size signal conductors ISIZ 42 and ESIZ 24. Additionally, parameter control 12 processes IR/W* 44 and ITS* 46 and then transmits this information as External Read/Write (ER/W*) signal 36 and External Transfer Start (ETS*) signal 32 respectively to system resource 7. In one embodiment, other transfer and operation information is transferred on one or on a plurality of conductors by way of an Other Signals (OTH) signal 30. Bus controller 5 then determines the total number of increments necessary to fulfill the request, based on data port size. This requested data could be an operand for storage in cache, or an instruction that a CPU in core 2 will use immediately. The ability to use data directly or store it for later use increases flexibility in data processing as well as reducing the time required for processor core 2 to access data and perform operations. In one embodiment of the present invention bus controller 5 defaults to burst transfers unless system resource 7 asserts Transfer Burst Inhibit (TBI*) signal 34. Bus coupling control 11 provides address information to system resource 7 and transfers data information between processor core 2 and system resource 7. Note that alternate embodiments of the present invention could instead use the assertion of a burst enable signal asserted to indicate burst transfers. For a data read, system resource 7 supplies bus controller 5 with the initial data starting at the access address along with a Data Acknowledge (DA*) signal 28 that acknowledges valid data transfer and indicates the size of its data port. For a data write, system resource 7 receives the data information from bus controller 5 and indicates the size of its data port. In one embodiment of the present invention DA* 28 is two bits in length, but alternate embodiments may use only one or may use any number of bits depending on the port sizes available. Note that in other embodiments of the present invention port size information may alternatively be encoded on other signals or may be provided separately. For purposes of this example, it is assumed that data processing system 3 is compatible with system resources of byte (8 bits), word (16 bits), or longword (32 bits) sized ports. However, alternate embodiments of the present invention may use any combination of port sizes.

Figure 3:
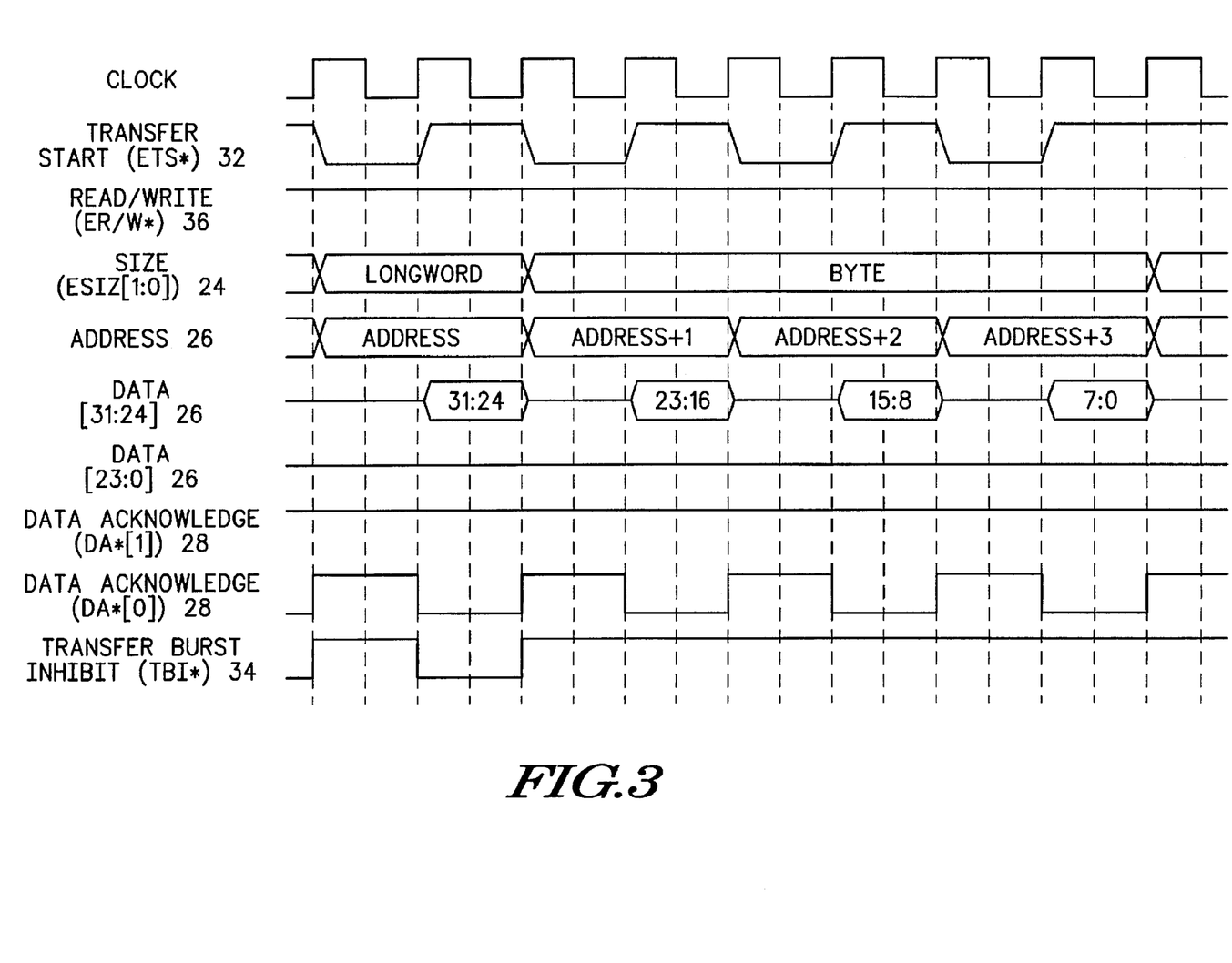
FIG. 3 illustrates, in timing diagram form, the timing of various signals in accordance with one embodiment of the present invention which has separate data and address busses and a system resource without burst capability.

Further to illustrate the advantage of burst transfers in comparison with non-burst transfers, consider one embodiment which has processor 3 and system resource 7 coupled to separate address and data busses. The timing diagram in FIG. 3 represents one embodiment where bus A/D 26 is separated into an address bus and a data bus and is not multiplexed. The diagram details the timing of a long word transfer from a byte sized port without burst transfer. The transfer begins when the processor core 2 supplies ISIZ 42 information indicating the requested data length. Processor core 2 also provides the access address and asserts ITS* 46. In this example, processor core 2 requests a long word of data. The bus controller 5 transmits this requested data length value to system resource 7, by control signal ESIZ 24. One clock cycle later, system resource 7 supplies data acknowledge signal 28 via conductors 28 indicating the port size of system resource 7. Note that alternate embodiments of the present invention may use only one or may use any number of DA* signals 28. Additionally, data port size values may be encoded with other signals provided separately, instead of on the DA* 28. In this example, the system resource 7 indicates that it is a byte sized port. In addition, the system resource 7 asserts TBI* 34 disallowing any burst access, and supplies the first byte of data. This first transfer of one byte of data requires two clock cycles. The second, third and fourth data transfers are identical and each requires two clock cycles. To transfer an entire long word requires system resource 7 to send four bytes of data, as seen in FIG. 3, each requiring two clock cycles. The total longword transfer therefore requires eight clock cycles.

Figure 4:
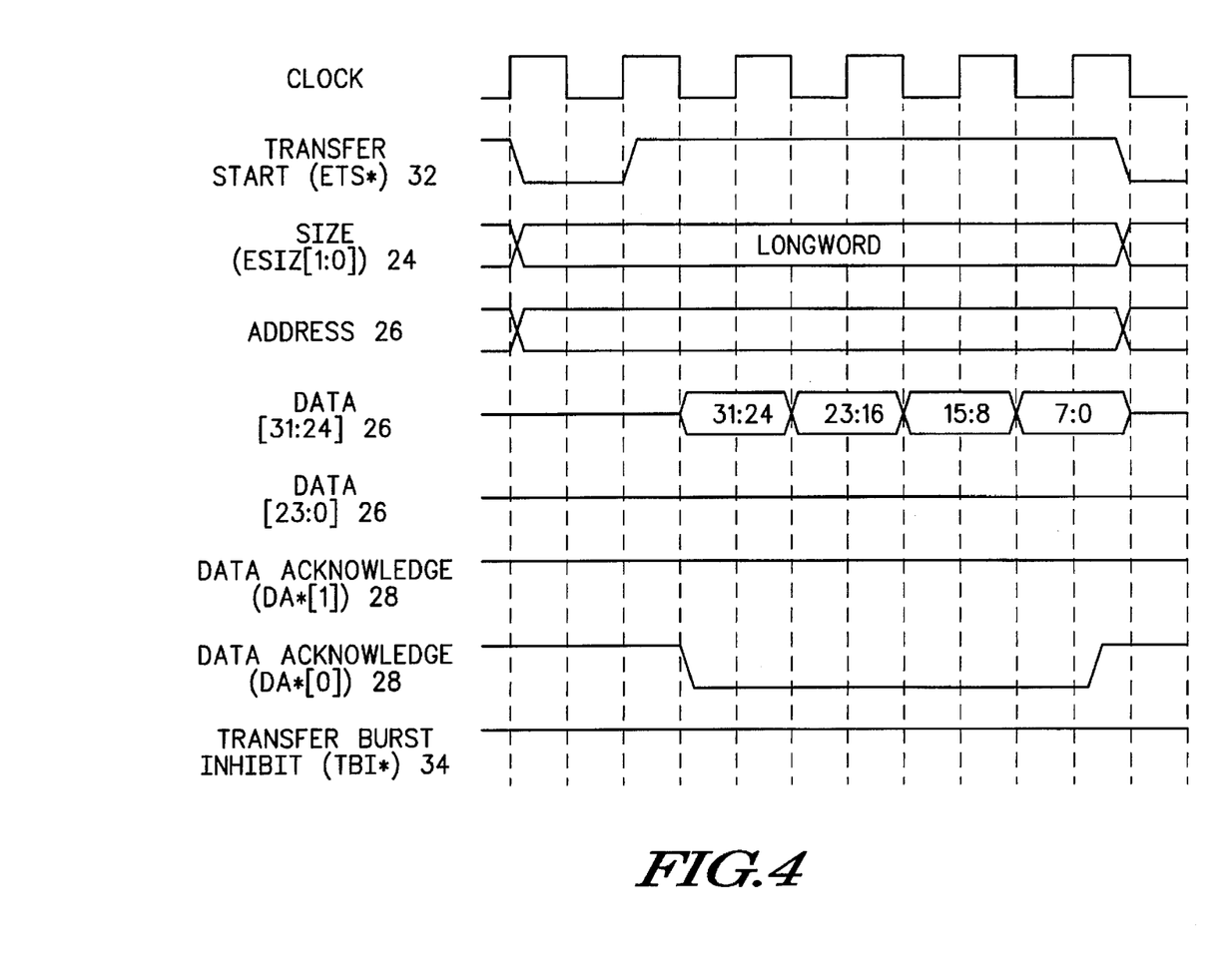
FIG. 4 illustrates, in timing diagram form, the timing of the various signals in accordance with one embodiment of the present invention which has separate data and address busses and a system resource with burst capability.

Comparing burst transfers to non-burst transfers, FIG. 4 illustrates the timing diagram of one embodiment where system resource 7 is a byte sized port, capable of burst transfers. As seen in FIG. 4, processor core 2 initiates the transfer by supplying requested data length as ISIZ 42, access address by Address bus 48, and transfer start indicator by ITS*. Likewise, system resource 7 supplies port size indicator on DA* 28 and begins sending data or A/D bus 26. There is no need for assertion of TBI* 34 in this case, as system resource 7 is capable of burst transfers. The first byte of data requires two clock cycles to transfer, just as in the example without burst capability. The second data transfer in this example is adjacent to the first. In one embodiment, during this transfer the address supplied on A/D 26 is not incremented, but is held for the entire long word transfer, however in alternate embodiments the address is incremented during this transfer. This means that the first byte of data requires two clock cycles but each successive byte making up the total burst requires one clock cycle each. In this example, the total write transfer will take five clock cycles. This reduces the total write transfer cycle count from eight clock cycles to five clock cycles. Such a reduction is accomplished by only supplying the initial address during burst mode rather than all incremental addresses as when transferring data without bursting. Note that in the bursting example, all of the same control signals are supplied to bus controller 5.

Figure 5:
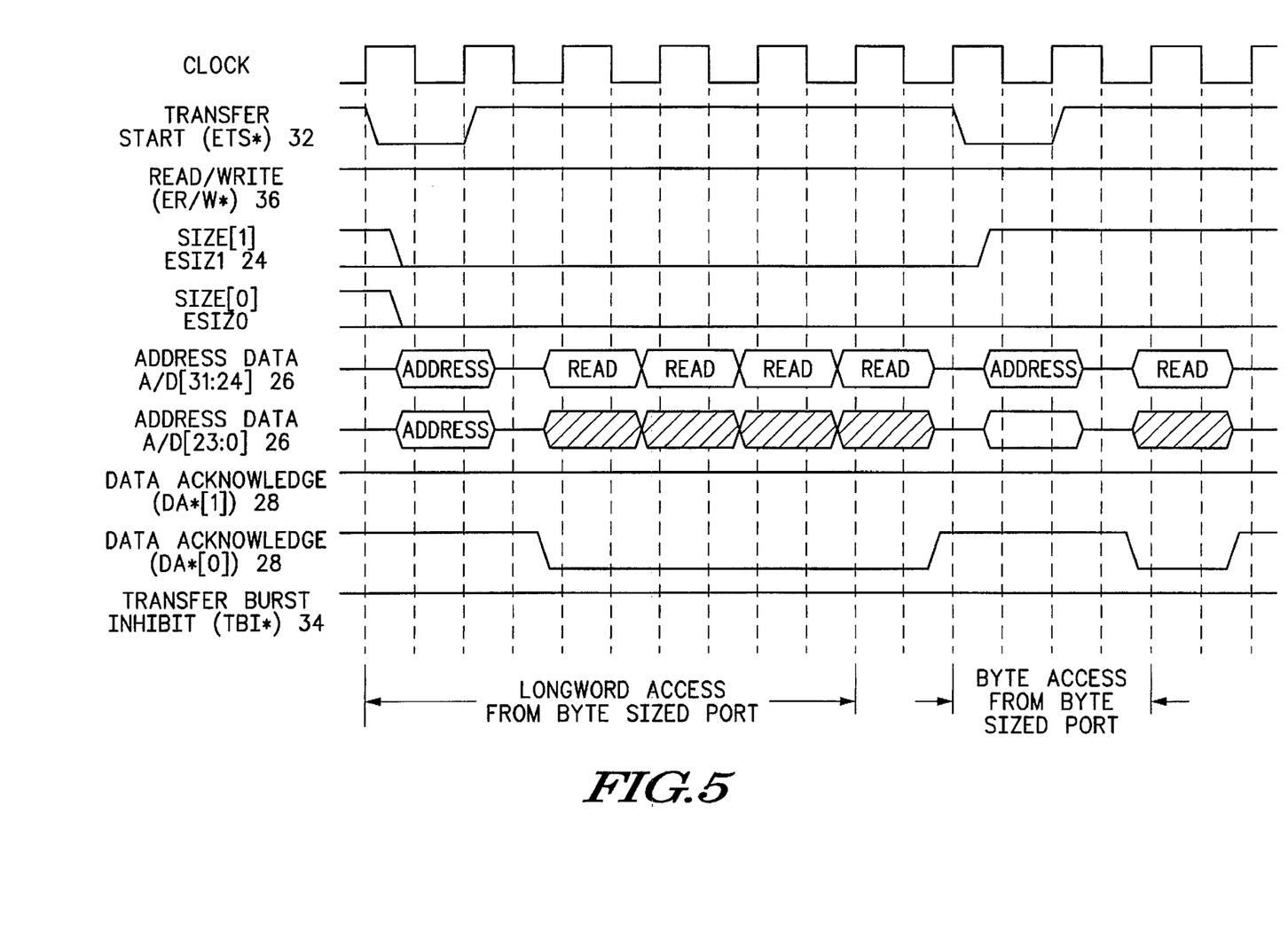
FIG. 5 illustrates, in timing diagram form, the timing of various signals in accordance with one embodiment of the present invention which has time multiplexed data and address busses and a system resource with burst capability.
Figure 6:
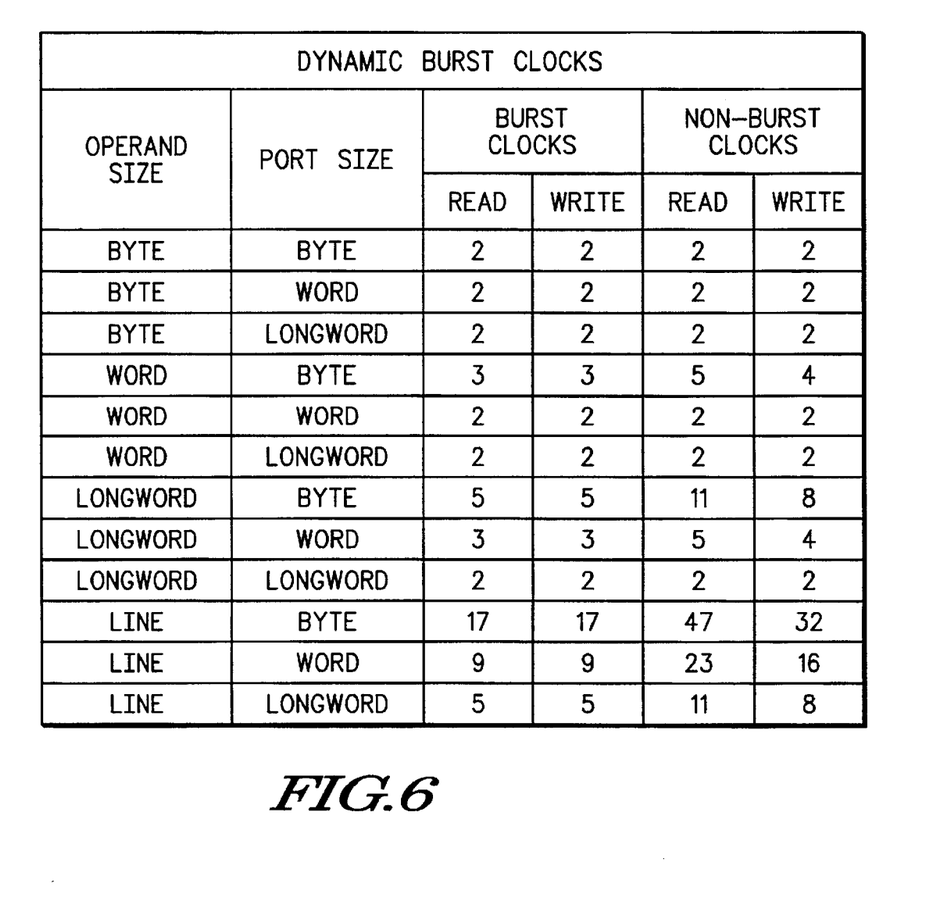
FIG. 6 illustrates, in tabular form, cycle reduction effected by various system configurations in accordance with one embodiment of the present invention.

To illustrate the advantage of burst transfers in one embodiment, FIG. 5 illustrates the timing diagram of sequential data transfers from a burst capable system resource 7 comprising several units each having different port sizes. In this embodiment, one unit is a burst capable byte sized port resource. Processor core 2 initiates each transfer by signaling a transfer start, indicating a read of data, supplying requested data length value, and sending an access address on the multiplexed bus. Bus controller 5 relays control signals between core 2 and system resource 7. System resource 7 responds by identifying itself as a byte sized port and supplies the first byte of data. Note that bus controller 5 is prepared for default burst transfer and system resource 7 does not request burst inhibit. The next three bytes of data are transferred in a burst to fulfill the processor core 2 requirement of a longword access. In this embodiment data is transferred on bits [31:24] of the multiplexed bus and this transfer requires five clock cycles. In one embodiment of the present invention, after completion of the transfer, DA* 28 indicates that system resource 7 is waiting for a next request. During a burst transfer, requested data length value and increment size (i.e. port size) are constant;

however, upon completion of a burst transfer both are subject to change. In this embodiment of the present invention, the multiplexed bus requires one idle clock cycle between transfers to avoid bus contention, however some alternate embodiments do not have this requirement. In this example, the next processor core 2 request is to access one byte of data. Processor core 2 initiates the next request by indicating transfer start, signaling a data read, sending requested data length value, and supplying a next access address. As the total number of burst increments or beats is one, it is not necessary for system resource 7 to indicate burst inhibit. This transfer completes in two clock cycles and, as seen in FIG. 6, a byte access on any sized port may offer no cycle savings as it does not incorporate the burst feature. However, there is a substantial saving realized whenever the port size of system resource 7 is less than the requested data length.

As a comparison of the possibilities for one embodiment, FIG. 6 shows in tabular form, a comparison of cycles required for burst transfers versus non-burst transfers. The chart refers to one embodiment of the present invention having a 32 bit microprocessor and considers several possible transfers. The left most column, labeled "Operand Size" indicates processor core 2 requested data length. The next column labeled "Port Size" refers to port size of system resource 7. The chart then lists the number of cycles required, for each of these possible combinations, to transfer data using burst transfers and non-burst transfers under the respective headings. Additionally broken down within each type of transfer (i.e. burst or non-burst) are the number of cycles for a read transfer and for a write transfer. Notice that for several combinations read transfers require more cycles than write transfers due to the addition of extra cycles to avoid bus contention on a multiplexed bus. The first example across the top row considers a processor core 2 requested data length of one byte from a system resource 7 with a byte sized port. There is no cycle count difference for burst or non-burst in this case. For a burst transfer, the system resource 7 would send one increment burst of one byte. This is in effect the same transfer as a non-burst transfer and therefore the cycle count is the same. Referring to the fourth row, where core 2 requests one word of data and the port size is one byte, there is an initial saving of two cycles using burst transfers rather than non-burst transfers for read transfers. Extending this further to row seven, where the processor core 2 requests one longword of data again from the byte sized port of system resource 7, there is a reduction of six cycles from the non-burst to the burst transfer during read transfers. This is illustrated in FIG. 5. FIG. 3 shows the non-burst transfer of one longword from a byte sized port.

Figure 7:
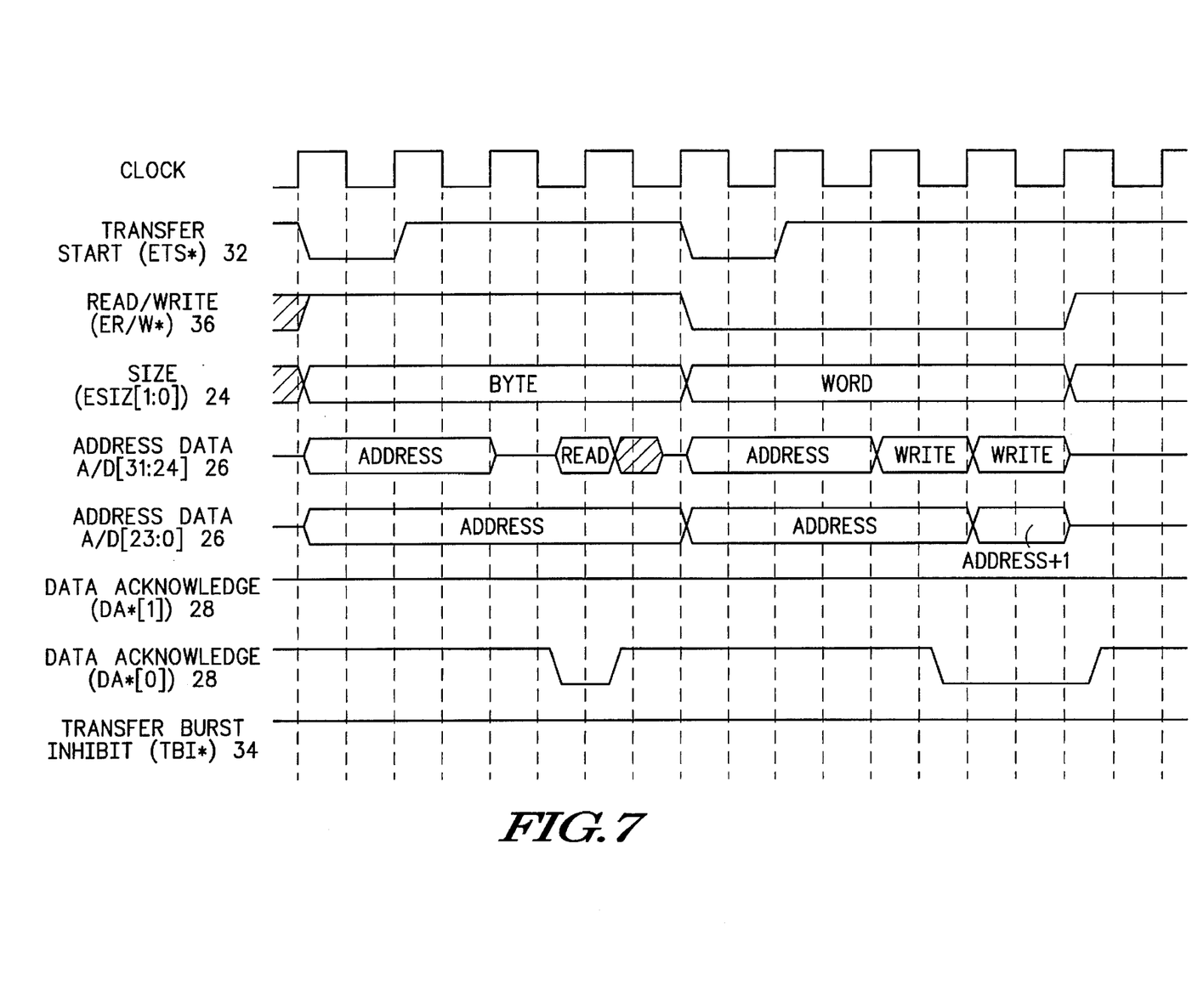
FIG. 7 illustrates, in timing diagram form, the timing of various signals in accordance with one embodiment of the present invention which has multiplexed data and address busses, which has the capability to drive the lower address bits, and which has a system resource with burst capability.

Therefore to enhance the data transfer methods described above, FIG. 7 illustrates one embodiment of the present invention, where processing system 10 maintains a constant data length, which is a sub-multiple of the bit capability of processor 3. In alternate embodiments of the present invention, the data length may be dynamically sized after the completion of an individual data transfer or the completion of a burst transfer. In this embodiment processor core 2 is a 32 bit processor while port size of system resource 7 is fixed at 16 bits. This means that data is fixed at 16 bits and is time multiplexed with 16 upper bits of a 32 bit address. In this embodiment, in response to an address extension control signal the 16 low bits of address, called an address extension, are not time multiplexed, but as seen in FIG. 7, are provided during both address phase and data phase of the data transfer cycle. This address extension eliminates the need for system resource 7 to latch these lower 16 bits of address. If in this example, system resource 7 has a 64k (i.e. 16 bits) address memory map, the address extension comprises the entire address and system resource 7 will not require any latching of address. In one embodiment of the present invention, bus controller 5 defaults to burst mode and processor core 2 sends a requested data length to bus controller 5. Bus controller 5 sends this requested data length information to system resource 7. In this embodiment, communication bus 26 has fixed address and data lengths of 32 bits and 16 bits respectively and there is no need to re-size communication bus 26. System resource 7 determines the number of increments necessary to satisfy the requested data length. For embodiments where system resource 7 is capable of burst transfers, each transfer burst begins when processor core 2 provides ITS* 46, IR/W* 44, ISIZ 42 and an access address. In response to these signals, system resource 7 prepares to either supply data or receive data of successive addresses so as to satisfy a required data length of processor core 2. System resource 7 makes these preparations based on the signals ETS* 32, ER/W* 36, ESIZ 24, and the access address. In this embodiment, bus controller 5 provides an address extension value during the data phase of data transfer and further during each successive data phase of a burst transfer. Additionally, in one embodiment, during each data phase of a burst transfer, bus controller 5 increments the lower 4 bits of each associated address. In this embodiment system resource 7 receives a full initial access address during the address phase of burst transfer, address extension value during the data phase of burst transfer, and lower 4 bits of address information with each associated data in a burst.

In a data processing system, the method of burst transfers coupled with dynamic bus sizing is an efficient method of data transfer, which is illustrated by the comparisons above. This addresses the need for a reduction in the total time required to process data. Additionally important is cost reduction in building the overall system. The present invention offers a method of reducing this cost by reducing the need for some of the components of the data processing system. This is accomplished by providing a portion of the address information to system resource 7 during the data phase of data transfer. By providing address with the data, the storage (i.e. latching) requirements of system resource 7 are reduced and even eliminated in some embodiments and system configurations. Adding to this, the present invention provides a portion of the address during the data phase of burst transfers. This directly reduces the overall system cost by reducing the need for interface devices typically used to latch address information from a multiplexed bus. During burst transfers, the present invention also increments a portion of the address with each successive data in the burst, and therefore it is not necessary for system resource 7 to increment that portion of the address. This invention offers a flexible, efficient, and economical method of transferring data.

We claim:

1. A method for providing valid addresses across a multiplexed communication bus, the method comprising the steps of:

initiating a first data transfer, the first data transfer having an address value and at least one data value, the address value including an address extension value, the address extension value having an address extension length;

providing an address extension control signal to a bus controller;

in response to receipt of the address extension control signal, allocating a portion of the multiplexed communication bus for the address extension length;

providing the address value during an address phase of the first data transfer;

providing the address extension value during a first data phase of the data transfer; and transferring a first data value across the multiplexed communication bus during the first data phase of the data transfer.

2. A method as in claim 1, further comprising the step of providing a requested data length to the bus controller.

3. A method as in claim 2, wherein said step of providing the requested data length comprises the step of:

providing a data length signal.

4. A method as in claim 3, wherein the data length signal is provided by a processor core.

5. A method as in claim 2, further comprising the steps of:

providing the address extension value during a second data phase of the first data transfer; and transferring a second data value across the multiplexed communication bus during the second data phase of the first data transfer.

6. A method as in claim 5, wherein the data transfer is a burst transfer.

7. A method as in claim 6, further comprising the step of:

providing the address value during a first address phase of the burst transfer.

8. A method as in claim 6, wherein a portion of lower bits of the address value are incremented with an associated data phase of the burst transfer.

9. A method as in claim 8, wherein a portion of lower bits of the address extension value are incremented with the associated data phase of the burst transfer.

10. A method as in claim 6, further comprising the step of:

providing a transfer burst inhibit signal to the bus controller.

11. A method as in claim 10, further comprising the step of:

initiating a new bus cycle and incrementing the address value if the transfer burst inhibit signal is asserted.

12. A data processing system, comprising:

a communication bus;

a processing unit; and bus controller circuit, coupled between said communication bus and said processing unit, said bus controller circuit having a first input, a second input, and an output, said bus controller circuit receiving a requested data length value at the first input, said bus controller circuit receiving an address extension control signal at the second input, said bus controller circuit providing an address value during an address phase of a data transfer and an address extension value during a data phase of the data transfer.

13. A data processing system as in claim 12, wherein said bus controller circuit allocates a portion of said communication bus for an address extension length.

14. A data processing system as in claim 13, wherein said bus controller circuit provides the address extension value on an allocated portion of said communication bus.

15. A data processing system as in claim 14, wherein the data transfer is a burst transfer, and wherein said bus controller circuit increments a portion of lower bits of the address value during an associated data phase of the burst transfer in response to the requested data length value and the address extension control signal.

16. A data processing system as in claim 12, wherein said bus controller circuit further comprises:

a parameter control circuit; and a bus coupling control circuit.

17. A data processing system as in claim 12, further comprising:

a system resource.

18. A data processing system as in claim 17, wherein said bus controller circuit provides the address value and an address extension value to said system resource.

19. A data processing system as in claim 18, wherein said system resource stores a part of the address value not included in the address extension value.

20. A data processing system as in claim 17, wherein said data transfer is a burst transfer, and wherein said bus controller circuit provides the address extension value and a portion of lower bits of the address value during an associated data phase of the burst transfer to said system resource.

21. A data processing system as in claim 17, wherein said system resource, said processing unit, and said bus controller circuit are resident on a same integrated circuit.

* * * * *